May 22, 1945.  J. L. HITE  2,376,594
COLLET SHIELD
Filed Feb. 5, 1944   3 Sheets-Sheet 1

INVENTOR
JESS L. HITE
BY
ATTORNEY

May 22, 1945.　　　　J. L. HITE　　　　2,376,594
COLLET SHIELD
Filed Feb. 5, 1944　　　3 Sheets-Sheet 2

INVENTOR
JESS L. HITE
BY
ATTORNEY

May 22, 1945.  J. L. HITE  2,376,594
COLLET SHIELD
Filed Feb. 5, 1944  3 Sheets-Sheet 3
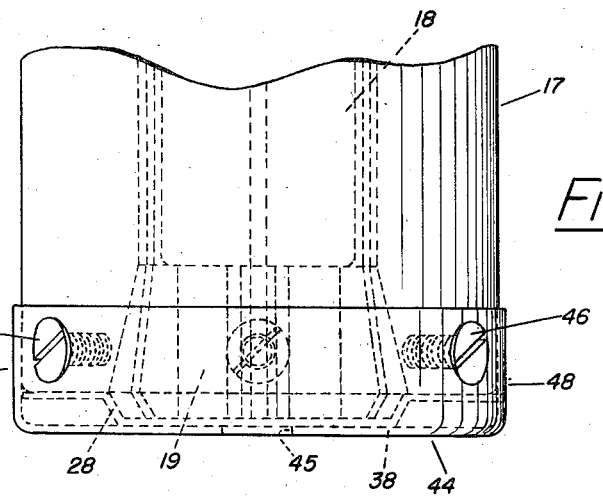
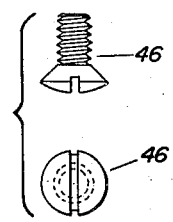
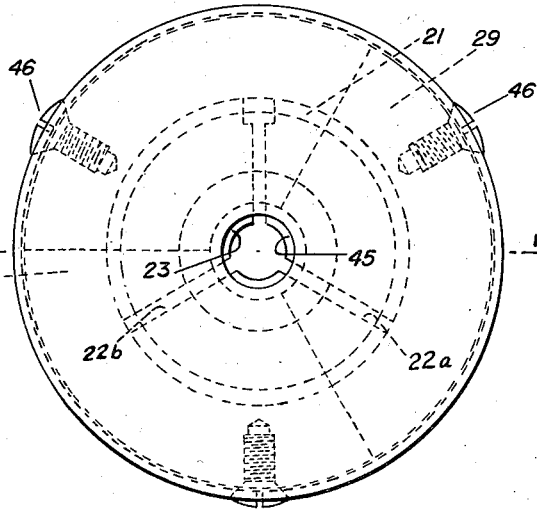
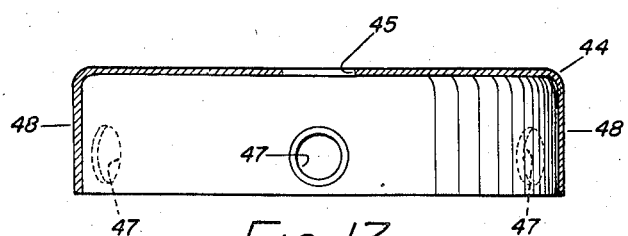
INVENTOR
JESS L. HITE
BY
ATTORNEY Patented May 22, 1945

2,376,594

UNITED STATES PATENT OFFICE 2,376,594

COLLET SHIELD

Jess L. Hite, Chula Vista, Calif., assignor to Rohr Aircraft Corporation, Chula Vista, Calif., a corporation of California Application February 5, 1944, Serial No. 521,235

4 Claims. (Cl. 279—46)

My invention relates to collet shields to be employed in hollow spindle lathes used for metal work, and its objects are to prevent metal particles, impinging or cast upon the exposed head of the collet, from gaining entrance to the slots therein and thereby impairing the operation of the lathe; to effect the attachment of covers or shields to the head of the collet so as to close its slots and to permit the ready removal of such closure means for replacement or repair; and in general to improve and render more effective the operation of the lathe of which said collet forms part. These and other objects will appear as illustrated in the drawings and as hereinafter set forth and described.

In the form of hollow spindle lathes now in common use for metal work, the spindle thereof is usually constructed with a round central passage having a conical flaring outlet, within which is removably seated and held the enlarged head of the collet, shaped closely to engage therewith; slots radially extending from a central bore in said collet permitting the same collapsibly to be wedged upon the work within said outlet. Upon the operation of the lathe, metal particles, including dust, shavings, chips and the like, thrown off from the work, tend to strike against the face of the collet and nose of the spindle and to force entry into said slots and to become irregularly packed therein; with the result that the engagement of the head of the collet with its spindle or with the work held by it is likely to become distorted and run out of true, or the efficiency of the collet mechanism otherwise impaired and even at times rendered inoperative.

Through the use of my collet shields, however, the entry of metal particles within the slots of the collet is effectively guarded against and prevented. Such shields are made by me in the form of detachable covers or closure caps or segments, which attached by bolts or screws or other means to the head of the collet or spindle, completely cover the exposed openings of its slots and thereby keep the same cleared of any matter thrown off from the work.

Attention is hereby directed to the drawing illustrating preferred forms or modifications of my invention, in which similar numerals of designation refer to similar parts throughout the several views, and in which—

Fig. 11 is a side elevation of the end portion of a lathe spindle embodying still another modification of my invention, showing a cap extending over the end of the collet and nose and adjacent sides of the spindle, and being attached to said spindle by screws;

Fig. 12 is an end view of the cap shown in Fig. 10, the attaching screws, bore and radial slots of the collet, being shown in dotted lines;

Fig. 13 is a section of the cap shown in Figf 11 on line 13—13 of Fig. 12, looking in the direction of the arrows, and Fig. 14 is a side elevation and end view of one of the attaching screws shown in Figs. 11 and 12.

Figure 1:
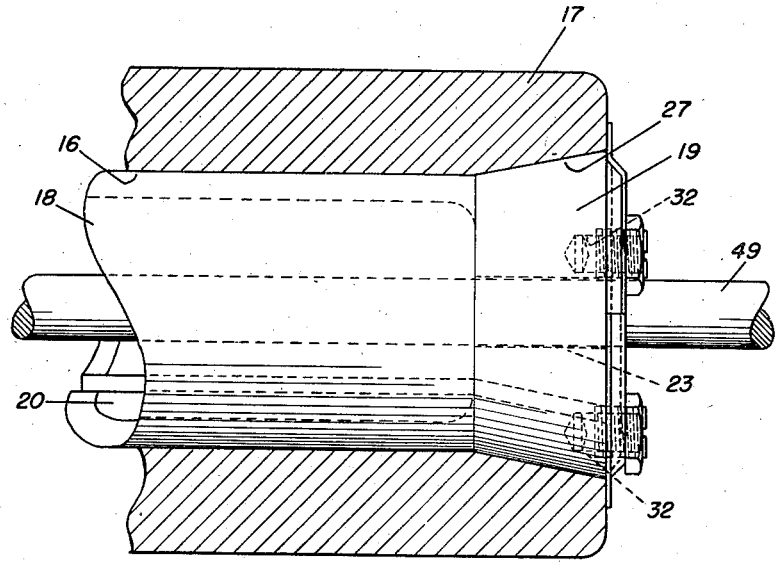
Figure 1 is a side elevation, partly in section, of one form of my invention showing the end portion of a lathe spindle employing a collet shield made up of three separable segments, the attachment screws, and the bore and radial slots of the collet being indicated in dotted lines.
Figure 2:
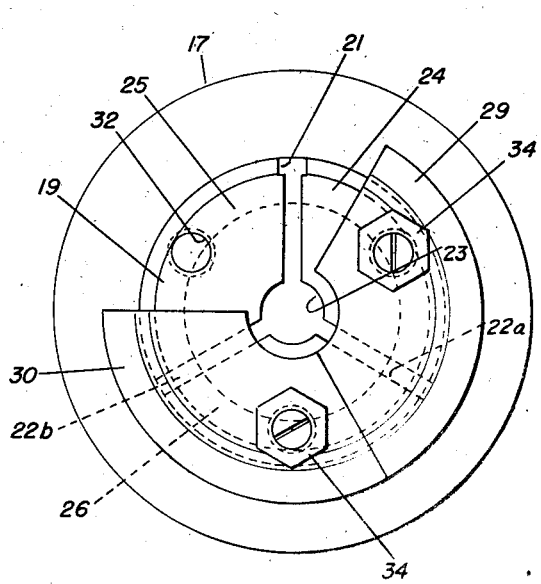
Fig. 2 is an end view of the construction illustrated in Fig. 1, showing the attachment of two of the three segments to the head of the collet, the remaining segment being removed for the purpose of better illustration.
Figure 3:
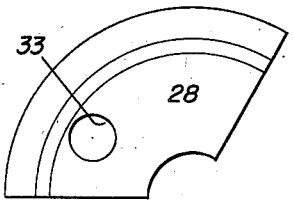
Fig. 3 is a view of one of the segments, showing the same detached from the head of the collet.
Figures 4, 5:
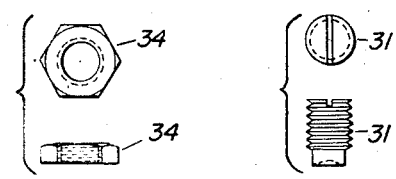
Fig. 4 is an end view and side elevation of one of the lock nuts shown in Figs. 1 and 2.
Fig. 5 is an end view and side elevation of one of the attaching screws shown in Figs. 1 and 2.

Referring to the form of my invention shown in Figs. 1 to 5 of the drawings, within the hollow 16 of the outer end portion of the spindle 17, forming part of a conventional lathe used for metal work, I install, in the usual manner well known in the art, the collet 18. This collet 18 is of the customary conventional construction, having the conical shaped flaring head 19, the round bore 20, the key slot 21, slots 22a and 22b, and central passage 23. These slots 21, 22a and 22b, as shown, serve to divide the head 19 into the solid parts 24, 25 and 26, which, upon the head being wedged into the conical shaped socket 27 within the spindle 17, are pressed inwardly upon the work 49 extending through the passage 23, and serve firmly to hold the same while being turned as is well understood in the art. For the purpose of preventing the ingress within said slots of metal particles normally thrown off the work against the face of the head 19 through the use of tools in the hands of the workman, I employ a shield composed of the segments 28, 29 and 30, each of which as shown is in the form of a flat strip of metal, preferably with its outer edge turned inwardly and outwardly, and is so formed that the adjacent edges of said segments may be abutted to form a continuous cap completely covering the face of the head 19 as well as the entrances to slots 21, 22a and 22b. To secure said segments to said head, I preferably employ attaching screws 31, the shanks of which are firmly embedded in recesses 32 bored to receive the same in said head, and the threaded ends of which extend through openings 33 provided therefor in each of said segments; lock nuts 34 serving to attach each of asid segments resiliently in position.

Figure 6:
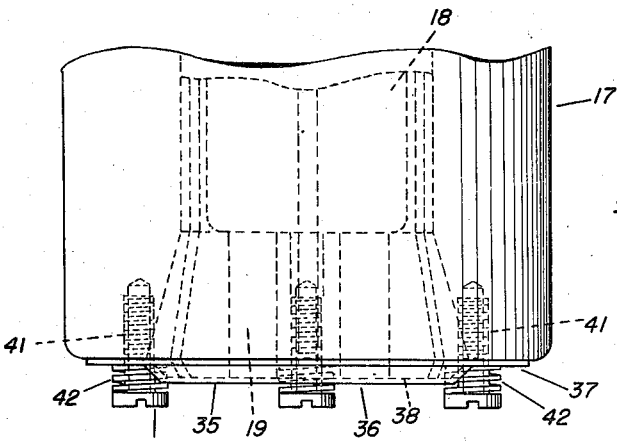
Fig. 6 is a side elevation of the end portion of a lathe spindle embodying another form of my invention, showing a collet shield made of a single disc with spring attachment.
Figure 9:
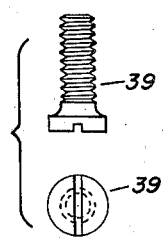
Fig. 9 is a side elevation and end view of one of the set screws shown in Figs. 6 and 7.
Figure 10:
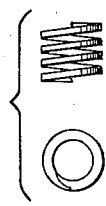
Fig. 10 is a side elevation and end view of one of the springs shown in Fig. 6.
Figure 7:
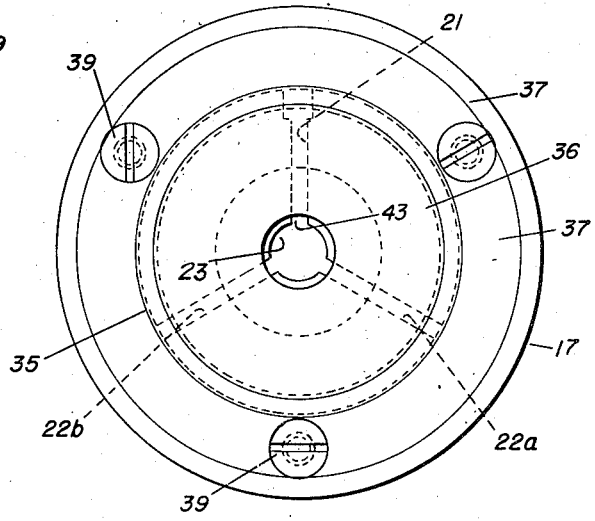
Fig. 7 is an end view of the construction illustrated in Fig. 6, the bore and radial slots of the collet being indicated in dotted lines.
Figure 8:
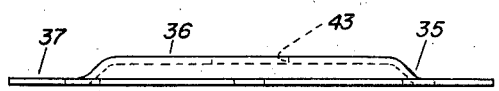
Fig. 8 is a cross section of the shield shown in Fig. 7, the said shield being detached from the construction there shown.

In the form of my invention shown in Figs. 6, 7 and 8, I use as a collet shield the disc 35, preferably made of one piece of metal and formed with a raised central portion 36, opening 43, and an annular flat rim portion 37, and being of sufficient breadth nearly to cover the face 38, including the slots 21, 22a and 22b, but permitting its central opening 43 to register with the collet openings 23 of the collet 18. Set screws 39, passing through openings provided therefor in said disc 35, and engaging with threaded sockets 41 in the end of the spindle 17, serve removably to secure said disc to said spindle. Preferably, I interpose expansion springs 42, surrounding the shanks of said screws, between the heads of said screws and the annular rim 37, in order to secure a more resilient attachment. This form of collet shield is advantageous in that a complete unbroken coverage is secured over the slots, but unlike the segmental form of shield, cannot be replaced in part, but must be installed and removed in entirety.

In the form of my invention shown in Figs. 11, 12 and 13, I employ as a collet shield the cap 44, made of one piece of metal with a central opening 45, and except for said opening completely covering the face 38 and slots of the collet 18, and nose and adjacent sides of the spindle 17. As shown, the said opening 45 is positioned in the central part of said shield so as to register with the central passage 23 of the collet 18. Set screws 46, passing through openings 47, in the side wall 48 of said cap 44, serve removably to secure said cap to the wall of the spindle 17. The advantage of this form of collet shield is that complete coverage of the end and adjacent sides of the spindle is secured, including the slots of the collet. If desired, segments, forming an additional protective disc extending (as shown in dotted lines) over said slots, may be interposed between the top of said cap and face of said collet, in which case the cap 44 serves not only as a shield against metal particles thrown off from the work, but also as a guard for said segments, which saill have the advantage of being replaced in part when repairs are required.

My invention may be embodied in other specific forms without departing from the spirit or essential characteristics thereof. The present embodiment, as above set forth, is therefore to be considered in all respects as illustrative and not restrictive, the scope of my invention being indicated by the appended claims rather than by the foregoing description, and all changes which come within the meaning and range of equivalency of the claims are therefore intended to be embraced therein.

What I claim and desire to secure by Letters Patent is:

1. In a hollow spindle lathe, the combination of a rotatable hollow spindle, a collet with a central passage extending therethrough installed within said spindle, said collet having a head with slots radiating outwardly from said passage and extending through to the face of said head, a shield covering the face of said head and exposed openings of said slots and detachably secured to the nose of said spindle.

2. In a hollow spindle lathe, the combination of a rotatable hollow spindle, a collet with a central passage extending therethrough installed within said spindle, said collet having an enlarged head with slots radiating outwardly from said passage and extending through to the face of said head, a shield covering the face of said head and exposed openings of said slots, and resilient means for detachably securing said shield to the nose of said spindle.

3. In a hollow spindle lathe, the combination of a rotatable hollow spindle, a collet with a central passage extending therethrough wedged within the hollow of said spindle, said collet having an enlarged head with slots radiating outwardly from said passage and extending through to the face of said head, and a cap covering the face of said head and openings of said slots, and covering the nose and adjacent wall of said spindle, and means for detachably securing said cap to the wall of said spindle.

4. In a hollow spindle lathe, the combination of a rotatable hollow spindle, a collet with a central passage extending therethrough wedged within the hollow of said spindle, said collet having an enlarged head with slots radiating outwardly from said passage and extending through to the face of said head, segments forming a shield covering the face of said collet and open ends of said slots, and a cap extending over said segments, and nose and adjacent wall of said spindle, and means for detachably securing said cap to the wall of said spindle.

JESS L. HITE.